United States Patent
Wang et al.

(10) Patent No.: US 11,894,529 B2
(45) Date of Patent: Feb. 6, 2024

(54) THERMAL MANAGEMENT OF BATTERY CELL TAB TEMPERATURE

(71) Applicant: GM Global Technology Operations LLC, Detroit, MI (US)

(72) Inventors: Yue-Yun Wang, Troy, MI (US); Omar Dauleh, Royal Oak, MI (US); Shifang Li, Shelby Township, MI (US); Derek Ivan George, Whitmore Lake, MI (US); Caleb Aaron Jones, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 99 days.

(21) Appl. No.: 17/375,505

(22) Filed: Jul. 14, 2021

(65) Prior Publication Data
US 2023/0013618 A1 Jan. 19, 2023

(51) Int. Cl.
| H01M 10/48 | (2006.01) |
| H01M 10/613 | (2014.01) |
| H01M 10/653 | (2014.01) |
| H01M 50/531 | (2021.01) |

(52) U.S. Cl.
CPC ....... *H01M 10/486* (2013.01); *H01M 10/613* (2015.04); *H01M 10/653* (2015.04); *H01M 50/531* (2021.01); *H01M 2220/20* (2013.01)

(58) Field of Classification Search
CPC ............. H01M 10/486; H01M 10/613; H01M 10/653; H01M 50/531; H01M 2220/20
See application file for complete search history.

(56) References Cited

U.S. PATENT DOCUMENTS

2022/0247006 A1* 8/2022 Moser .................. H01M 50/211
2022/0299569 A1* 9/2022 Kurtz .................... H02J 7/0013

* cited by examiner

*Primary Examiner* — James Lee
(74) *Attorney, Agent, or Firm* — CANTOR COLBURN LLP (57) ABSTRACT

A vehicle includes a system operating a method of controlling a temperature at a battery cell of the vehicle. The system includes the battery cell, a temperature sensor and a processor. The battery cell has a tab for flow of current to and from the battery cell. The temperature sensor is configured to measure a cell temperature of the battery cell at a location away from the tab. The processor is configured to predict a tab temperature from the cell temperature, and control a power supplied to a load from the battery cell based on the tab temperature.

20 Claims, 14 Drawing Sheets

THERMAL MANAGEMENT OF BATTERY CELL TAB TEMPERATURE

INTRODUCTION

The subject disclosure relates to controlling temperatures in a battery cell and specifically to a system and method for controlling operation of a battery cell based on a calculated temperature at a tab of a battery cell.

Electric vehicles derive their electricity from battery packs that house a plurality of battery cells. A battery cell includes a tab through which current flows into and out of the battery cell. Current or power through the battery cells can increase a temperature of the battery cell or a component of the battery cell above a safe operating temperature. Due to the dimensions of the tab, tabs are most likely to reach this safe threshold temperature before any other component. Unfortunately, it is difficult to place a sensor at a tab that can measure tab temperature directly due to design and packaging considerations. Accordingly, it is desirable to provide a method of determining tab temperature from other temperature measurements that can be obtained from the battery cell.

SUMMARY

In one exemplary embodiment, a method of controlling a temperature at a battery cell is disclosed. A cell temperature is measured at the battery cell, the battery cell including a tab for flow of current to and from the battery cell, wherein the cell temperature is obtained at a location away from the tab. A tab temperature for the tab is predicted from the cell temperature. A power supplied to a load from the battery cell is controlled based on the tab temperature.

In addition to one or more of the features described herein, the battery cell is included in a battery module and obtaining the cell temperature further includes obtaining one of a maximum temperature and a minimum temperature of the battery cell at a location of the battery module separate from the battery cell, and an average temperature of the battery cell. The method further includes predicting the tab temperature using a dynamic thermal model of a heat exchange process around the cell tab and current bus bar that is based on a current at the battery cell and the cell temperatures. In an embodiment, the tab is in thermal contact with a bus and the bus is in thermal contact with a heat sink, and the dynamic thermal model determines a state of the battery cell based on a thermal heating of the tab, the bus and the heat sink due to the current through the tab. A Kalman filter is applied to the state of the battery cell determined using the dynamic thermal model to determine the tab temperature. The method further includes derating the power supplied to the load when the tab temperature is greater than or equal to a temperature limit. The load is at least one of an electric motor of a vehicle, and an electrical component of the vehicle.

In another exemplary embodiment, a system for controlling a temperature at a battery cell is disclosed. The system includes a temperature sensor and a processor. The temperature sensor is configured to measure a cell temperature at the battery cell, the battery cell including a tab for flow of current to and from the battery cell, wherein the temperature sensor is at a location away from the tab. The processor is configured to predict a tab temperature for the tab from the cell temperature, and control a power supplied to a load from the battery cell based on the tab temperature.

In addition to one or more of the features described herein, the battery cell is included in a battery module and the temperature sensor further comprises one of a maximum temperature sensor for measuring a maximum temperature of the battery module and a minimum temperature sensor for measuring a minimum temperature of the battery module, and an average temperature sensor for measuring an average temperature of the battery cell. The processor is further configured to predict the tab temperature using a dynamic thermal model of the battery cell based on a current at the battery cell and the cell temperature. In an embodiment, the tab is in thermal contact with a bus and the bus is in thermal contact with a heat sink, and the processor is further configured to determine a state of the battery cell using the dynamic thermal model, the dynamic thermal model based on a thermal heating of the tab, the bus and the heat sink due to the current through the tab. The processor is further configured to apply a Kalman filter to the state of the battery cell determined using the dynamic thermal model to determine the tab temperature. The processor is further configured to derate the power supplied to the load when the tab temperature is greater than or equal to a temperature limit. The processor is further configured to derate power based on a maximum allowed battery current limit, the battery current limit being based on the temperature limit and dynamic thermal model of the battery cell.

In yet another exemplary embodiment, a vehicle is disclosed. The vehicle includes a battery cell, a temperature sensor and a processor. The battery cell has a tab for flow of current to and from the battery cell. The temperature sensor is configured to measure a cell temperature of the battery cell at a location away from the tab. The processor is configured to predict a tab temperature from the cell temperature, and control a power supplied to a load from the battery cell based on the tab temperature.

In addition to one or more of the features described herein, the battery cell is included in a battery module and the temperature sensor further comprises one of a maximum temperature sensor for measuring a maximum temperature of the battery module or a battery pack that includes the battery module and a minimum temperature sensor for measuring a minimum temperature of the battery module or pack, and an average temperature sensor for measuring an average temperature of the battery module or pack. The processor is further configured to predict the tab temperature using a dynamic thermal model of the battery cell based on a current at the battery cell and the cell temperature. In an embodiment, the tab is in thermal contact with a bus and the bus is in thermal contact with a heat sink, and the processor is further configured to determine a state of the battery cell using a dynamic thermal model, the dynamic thermal model including on a thermal heating of the tab, the bus and the heat sink due to the current through the tab. The processor is further configured to apply a Kalman filter to the state of the battery cell determined using the dynamic thermal model to determine the tab temperature. The processor is further configured to derate the power supplied to the load when the tab temperature is greater than or equal to a temperature limit.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
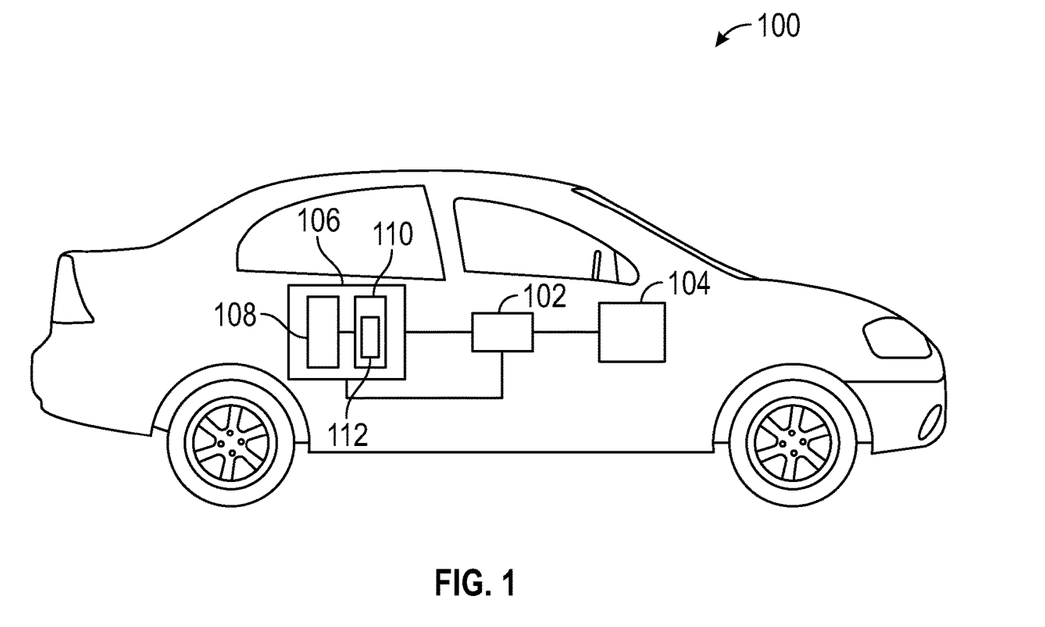
FIG. 1 shows a vehicle operable using a battery pack disclosed herein.

In accordance with an exemplary embodiment, FIG. 1 shows a vehicle 100 operable using a battery pack 102 disclosed herein. The vehicle 100 includes the battery pack 102 and an electrical load 104 which operates off of electricity supplied by the battery pack 102. The vehicle 100 further includes a control system 106 for controlling the operation of the battery pack 102. The control system 106 includes a processor 108 and a memory storage device 110 having various programs 112 or instructions stored therein. The processor 108 accesses the programs or instructions from the memory storage device 110 and runs the programs or instructions to perform the various operations disclosed herein. The processor 108 determines or calculates a temperature of the battery pack 102 or a component of the battery pack 102 and controls operation of the battery pack to maintain the temperature below a selected temperature threshold.

Figure 2:
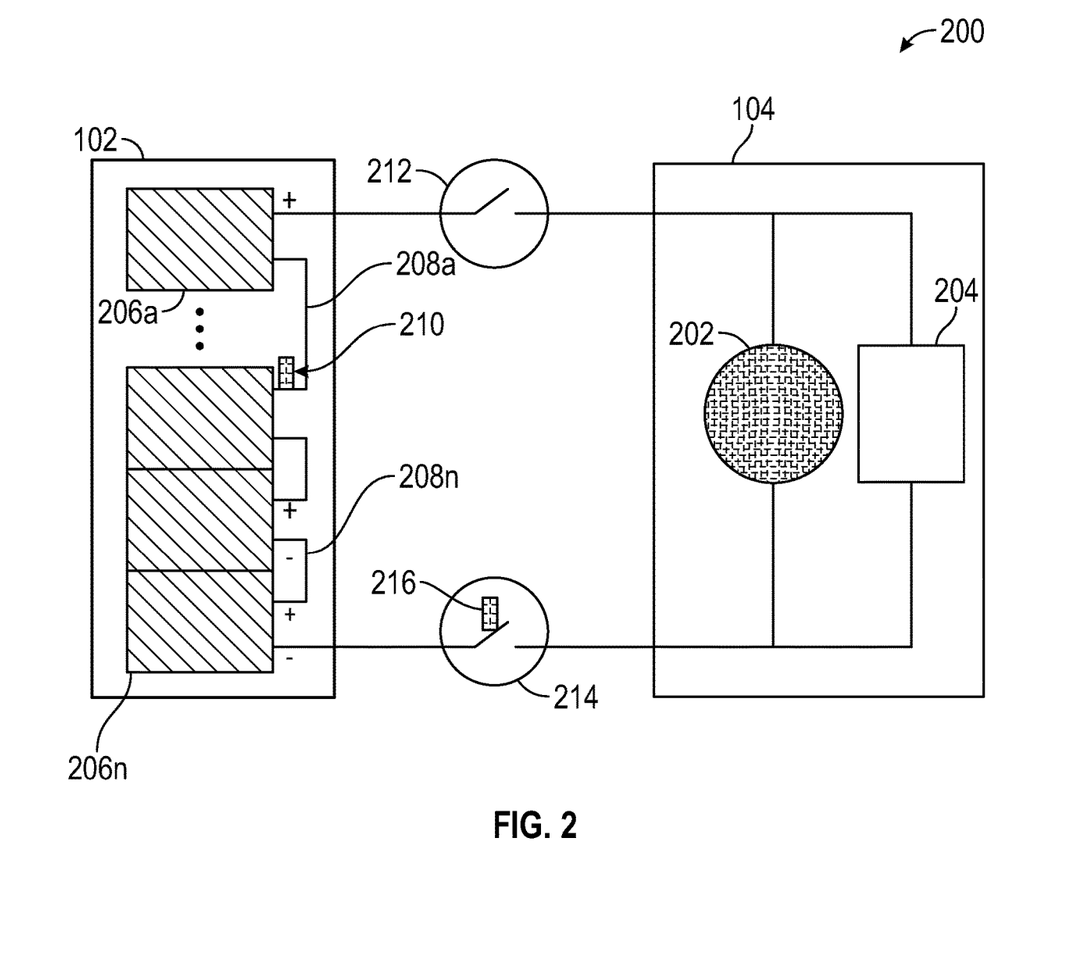
FIG. 2 shows a detailed diagram of an electrical system of the vehicle of FIG. 1 operable using the battery pack.

FIG. 2 shows a detailed diagram 200 of an electrical system of the vehicle 100 of FIG. 1. The electrical system includes the battery pack 102 and electrical load 104. The electrical load 104 can include an electrical motor 202 of the vehicle 100 and/or other electrical components 204, such as dashboard lights, exterior lights, entertainment systems, etc.

The battery pack 102 includes a plurality of battery modules 206a-206n which are connected in series by a plurality of buses 208a-208n. A bus temperature sensor 210 is shown disposed on bus 204a for measuring a temperature of the bus 204a during operation of the battery pack 102. Although only one bus temperature sensor (i.e., bus temperature sensor 210) is shown, other bus temperature sensors can be disposed in any of the plurality of buses 208a-208n, in various embodiments.

A battery disconnect switch 214 is disposed on an electrical wire between the battery pack 102 and the electrical load 104. The battery disconnect switch 214 allows an operator of the vehicle to connect and disconnect the battery pack 102 to and from the electrical load 104. A battery disconnect unit 212 (also referred to herein as "BDU") is disposed on another electrical wire between the battery pack 102 and the electrical load 104. The battery disconnect unit 212 controls a power flow to the load from the battery pack 102 based on a measured temperature at the battery pack 102 such as a tab temperature of a cell of the battery pack. The battery disconnect unit 212 includes a BDU sensor 216 that measures the temperature ($T_{BDU}$) at the battery disconnect unit 212.

Figure 3:
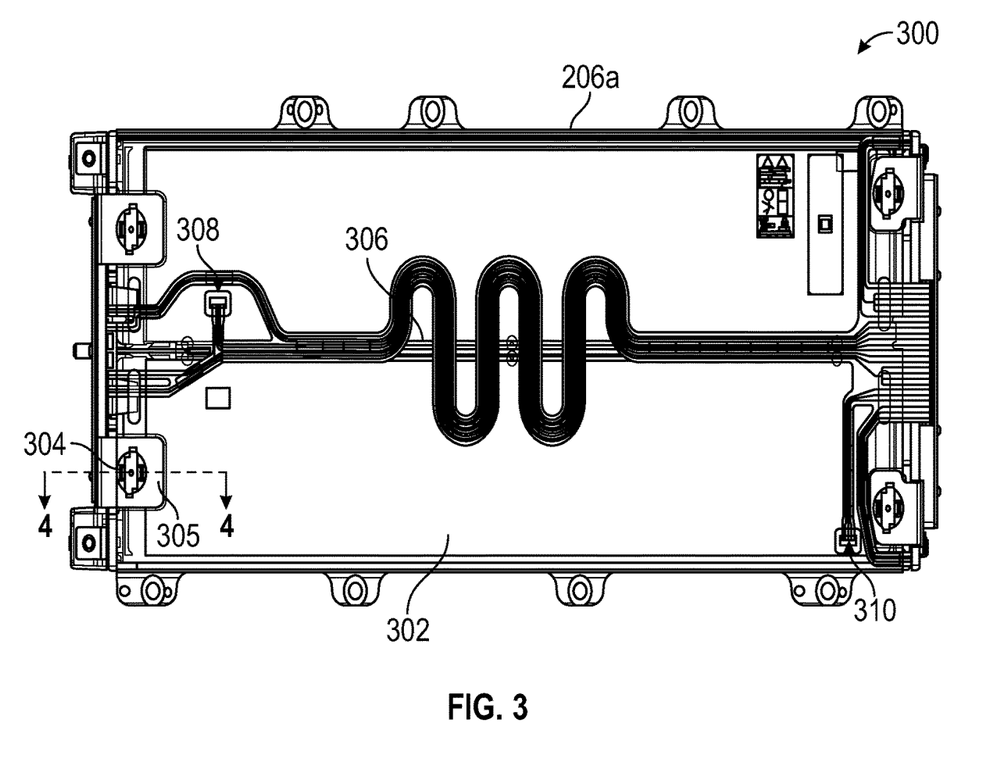
FIG. 3 shows a top view of a battery module of the battery pack.

FIG. 3 shows a top view 300 of a battery module of FIG. 2, such as battery module 206a, in an embodiment. The battery module 206a includes a battery cell 302 and a tab 304 that is disposed at a tab junction 305. A cross-sectional line 4-4 is shown at the tab junction, which is shown in detail in FIG. 4. A coolant line 306 allows a coolant to flow along an axis of the battery module 206a to cool the battery module. In various aspects, the coolant creates regions of cooler temperature and regions of hotter temperature. A first temperature sensor 308 is located near the coolant line and measures a minimum or substantially minimum temperature ($T_{min}$) of the battery module 206a. A second temperature sensor 310 is located away from the coolant line (near an outer edge of the battery cell) and measures a maximum or substantially maximum temperature ($T_{max}$) of the battery cell.

In various embodiments, the tab 304 is the component of the battery module 206a that heats the fastest due to current flow and is most vulnerable to failure or burning out due to high temperatures caused by current flow. In addition, the high temperatures created at the tab can heat a battery cell and age the battery cell quickly. The methods disclosed herein predict a temperature of the tab 304 based on temperature measurements obtained at different locations (i.e., $T_{max}$, $T_{min}$, etc.) of the battery module 206a as well as battery current measurements. In various embodiments, the tab temperature is determined by solving a dynamic model or thermal model that uses the temperature measurements and current measurements. The predicted tab temperature can then be used to calculate a power output at the battery cell or battery pack that allows for safe operation of the vehicle.

Figure 4:
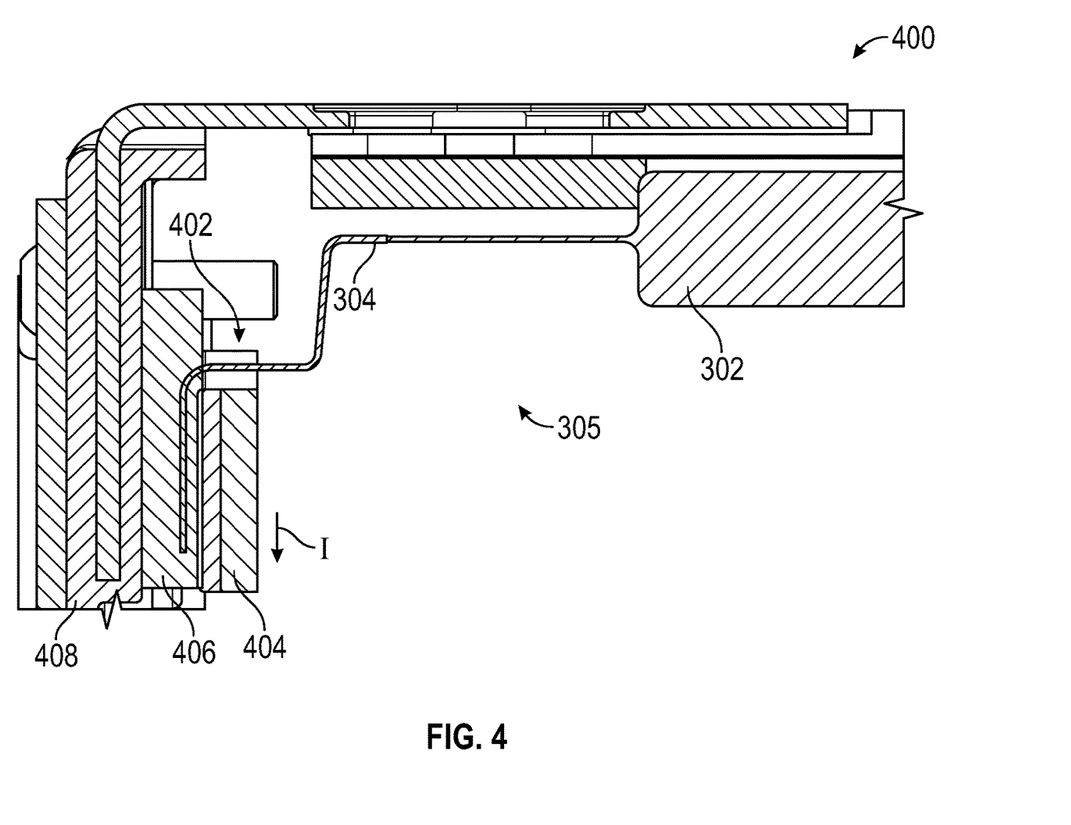
FIG. 4 shows a side view of the tab junction of the battery module taken along line 4-4 of FIG. 3.

FIG. 4 shows a side view 400 of the tab junction 305 of the battery module 206a of FIG. 3 taken at the cross-sectional line 4-4. The side view 400 shows an end of the battery cell 302 the tab 304, a bus bar 402 and a heat sink 408. The bus bar 402 includes an electrical bus 404 and a thermal bus 406. The tab 304 extends between the battery cell 302 and the thermal bus 406. An electrical current from the battery cell 302 flows through the tab 304 and into the electrical bus 404.

Heat can flow between the tab 304 and the battery cell 302 as well as between the tab 304 and the thermal bus 406. The thermal bus 406 is in thermal contact with a tab cooling mass or heat sink 408. Heat exchange between the battery cell 302, tab 304, thermal bus 406 and heat sink 408 is given by a thermal model. The thermal model is given by the set of dynamic thermal equations shown in Eqs. (1)-(3):

$$C_{tab}dT_{tab}/dt = I^2 R_{tab} - K_1(T_{tab}-T_{max}) - K_3(T_{bus}-T_{tab}) \quad \text{Eq. (1)}$$

$$C_{bus}dT_{bus}/dt = I^2 R_{bus} + K_3(T_{bus}-T_{tab}) + K_2(T_{sink}-T_{bus}) \quad \text{Eq. (2)}$$

$$C_{sink}dT_{sink}/dt = K_2(T_{sink}-T_{bus}) - K_4(T_{sink}-T_{cool}) \quad \text{Eq. (3)}$$

where $C_{tab}$ is the thermal capacity of the tab 304, $C_{bus}$ is the thermal capacity of the thermal bus 406 and $C_{sink}$ is the thermal capacity of the heat sink 408, I is the current flowing from the battery cell 302 through the tab 304 and the thermal bus 406, $R_{tab}$ is the electrical resistance of the tab 304, and $R_{bus}$ is the electrical resistance of the electrical bus 404. $T_{tab}$ is the temperature of the tab 304, $T_{max}$ is the temperature measured at first temperature sensor 308, $T_{min}$ is the temperature measured at the second temperature sensor 310, $T_{bus}$ is the bus temperature and $T_{sink}$ is the temperature of the heat sink 408. $T_{cool}$ is a temperature of a surrounding environment. In Eq. (3), $T_{cool}$ can be replaced by $T_{min}$. Eqs. (1)-(3) can be solved using temperature measurements in order to determine the tab temperature $T_{tab}$.

Figure 5:
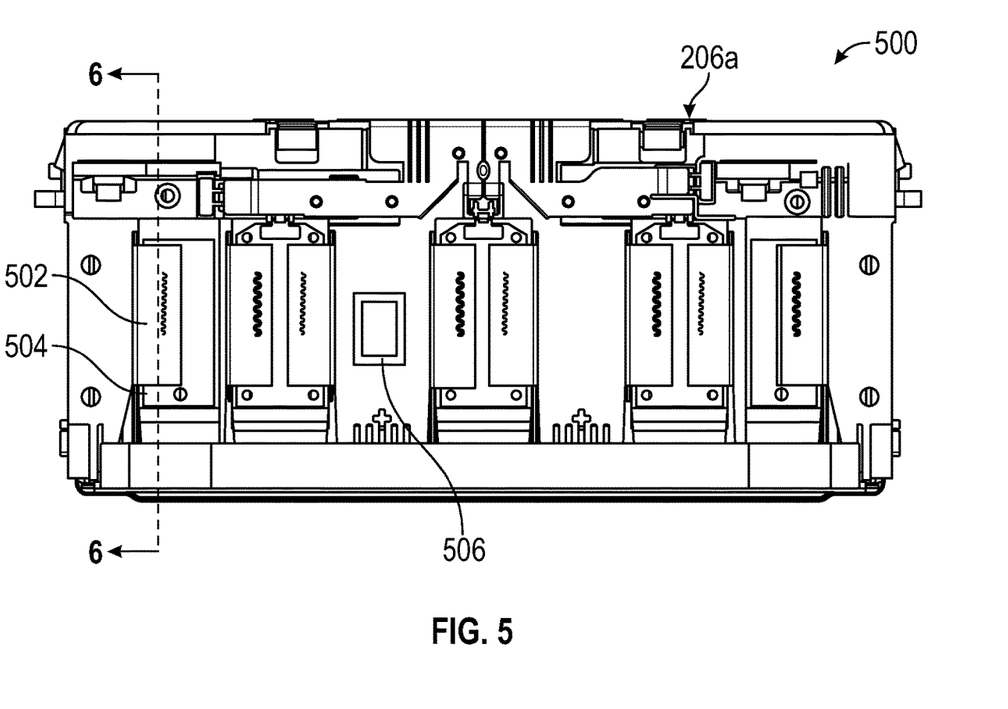
FIG. 5 shows a top view of the battery module in another embodiment.

FIG. 5 shows a top view 500 of the battery module 206a in another embodiment. The battery module 206a includes a battery cell 502 and a tab 504. An average temperature sensor 506 measures an average temperature ($T_{avg}$) of the battery module 206a. A cross-sectional line 6-6 is shown along an axis of the battery cell 502

Figure 6:
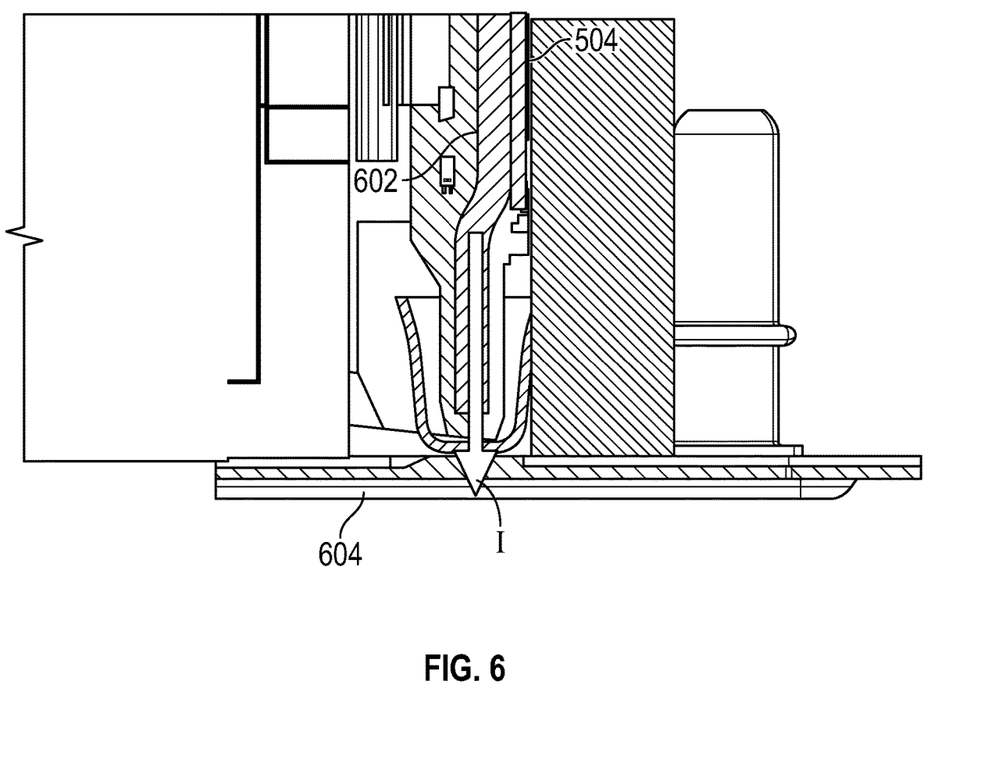
FIG. 6 shows a side view of a tab junction of the battery module of FIG. 5 taken along line 6-6 of FIG. 5.

FIG. 6 shows a side view of a tab junction of the battery module 206a of FIG. 5 taken at the cross-sectional line 6-6. Tab 504 provided a flow of current I and is in thermal contact with the bus bar 602 which is in thermal contact with a cooling plate of heat sink 604. Heat exchange between the battery cell 502, tab 504, bus bar 602 and heat sink 604 is given by a thermal model including the set of dynamic thermal equations shown in Eqs. (4)-(6):

$$C_{tab}dT_{tab}/dt = I^2 R_{tab} - K_1(T_{tab}-T_{avg}) - K_3(T_{bus}-T_{tab}) \quad \text{Eq. (4)}$$

$$C_{bus}dT_{bus}/dt = I^2 R_{bus} + K_3(T_{bus}-T_{tab}) - K_4(T_{bus}-T_{sink}) \quad \text{Eq. (5)}$$

$$C_{sink}dT_{sink}/dt = K_2(T_{sink}-T_{bus}) - K_4(T_{sink}-T_{cool}) \quad \text{Eq. (6)}$$

where $T_{avg}$ is the average temperature measured at the average temperature sensor 506. As with Eq. (3), $T_{cool}$ can be replaced by $T_{min}$ in Eq. (6).

In various embodiments, Eqs. (4)-(6) can be simplified when the thermal mass of the heat sink 604 low enough to be considered negligible. In this scenario, cooling of the tab 504 is more dependent on the temperature of the heat sink 604. The simplified set of equations is shown in Eqs. (7) and (8):

$$C_{tab}dT_{tab}/dt = I^2 R_{tab} - K_1(T_{tab}-T_{avg}) - K_3(T_{bus}-T_{tab}) \quad \text{Eq. (7)}$$

$$C_{bus}dT_{bus}/dt = I^2 R_{bus} + K_3(T_{bus}-T_{tab}) - K_4(T_{bus}-T_{cool}) \quad \text{Eq. (8)}$$

Figure 7:
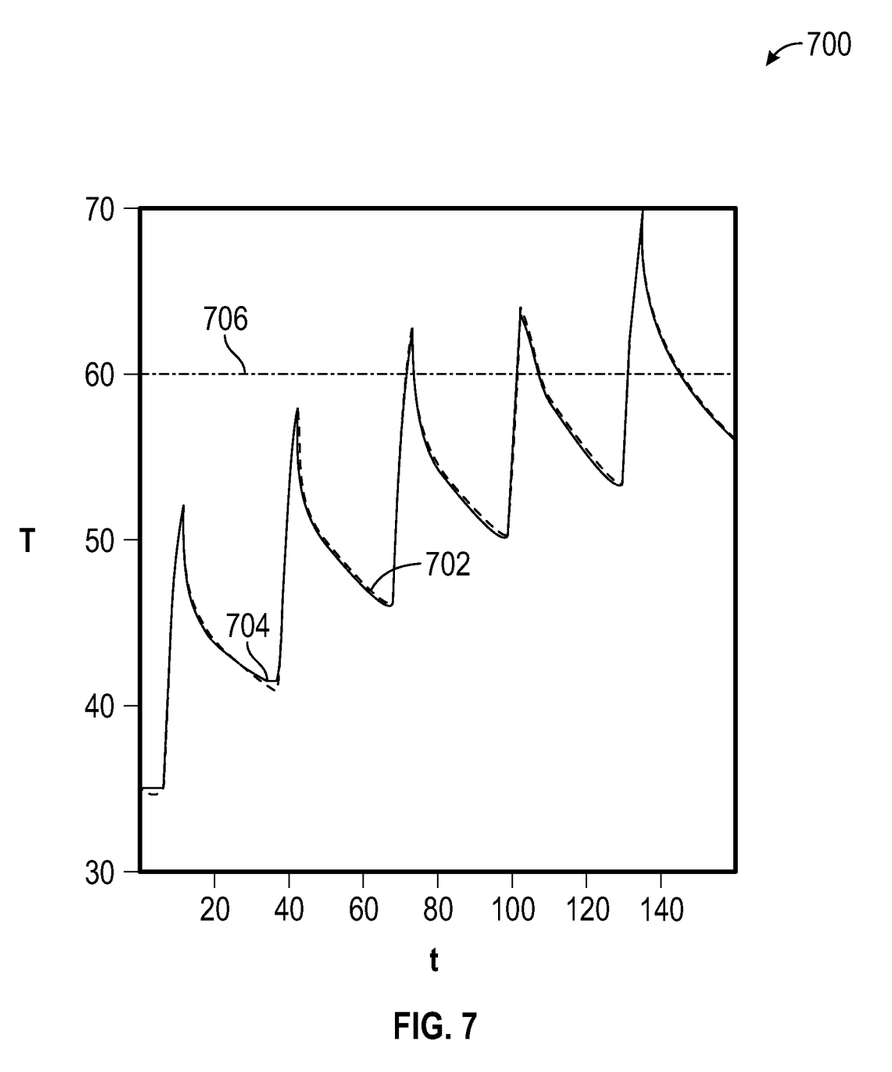
FIG. 7 shows a graph of tab temperature values over time for a battery pack supplying power to an electrical motor that is operating the vehicle at 80 miles per hour.

FIG. 7 shows a graph 700 of $T_{tab}$ values over time for a battery pack supplying power to an electrical motor 202 that is operating the vehicle at 80 miles per hour. Time (t) is shown along the x-axis and temperature (T) is shown along the y-axis. Curve 702 shows an actual tab temperature and curve 704 shows a calculated tab temperature using Eqs. (4)-(6). Curve 704 agrees with curve 702 with 95% accuracy. A temperature threshold 706 shows a maximum operating temperature for the battery cell tab.

Figure 8:
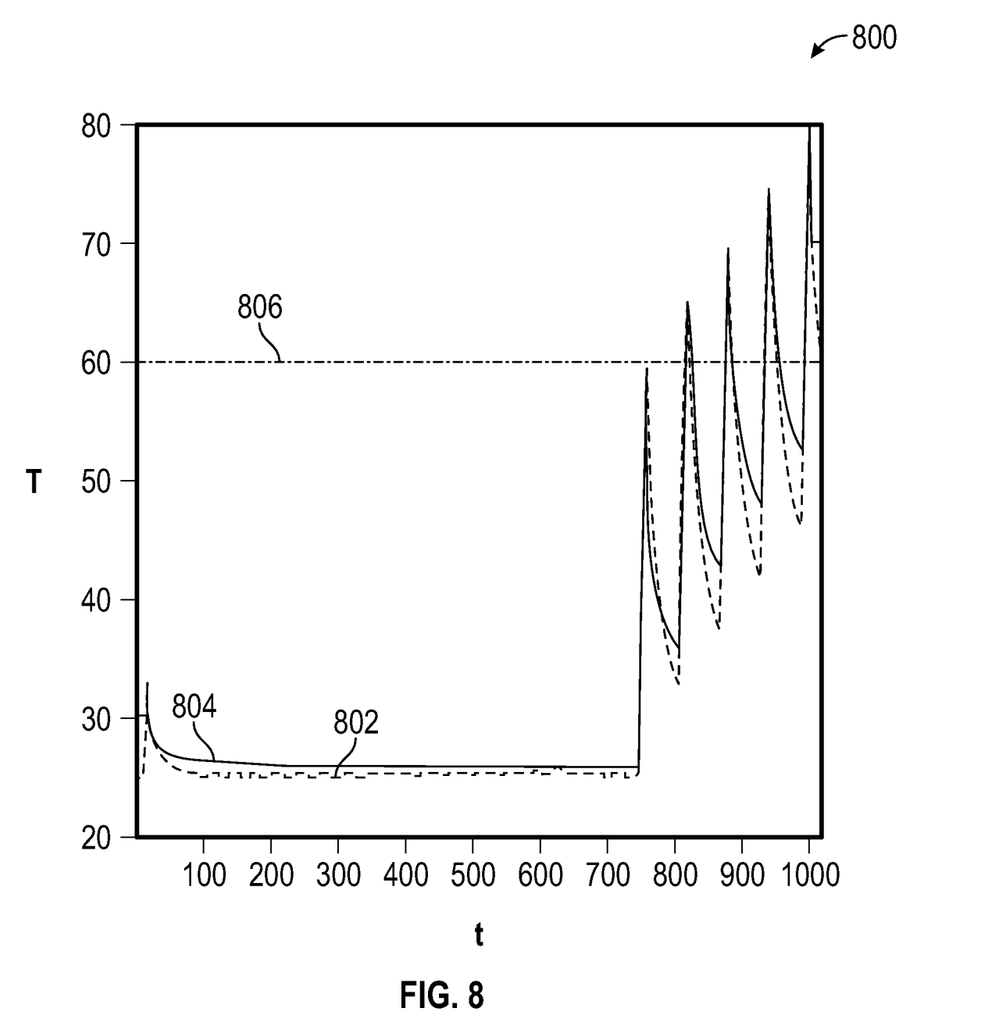
FIG. 8 shows a graph of tab temperature values over time for a battery pack supplying power to an electrical motor that is operating the vehicle during a high power driving maneuver.

FIG. 8 shows a graph 800 of $T_{tab}$ values over time for a battery pack supplying power to an electrical motor 202 that is operating the vehicle 100 during a high power driving maneuver. Time (t) is shown in seconds along the x-axis and temperature (T) is shown along the y-axis. Curve 802 shows an actual tab temperature and curve 804 shows a calculated tab temperature using Eqs. (4)-(6). Curve 804 agrees with curve 802 with 83% accuracy. A temperature threshold 806 shows a maximum operating temperature for the battery cell tab.

Figure 9:
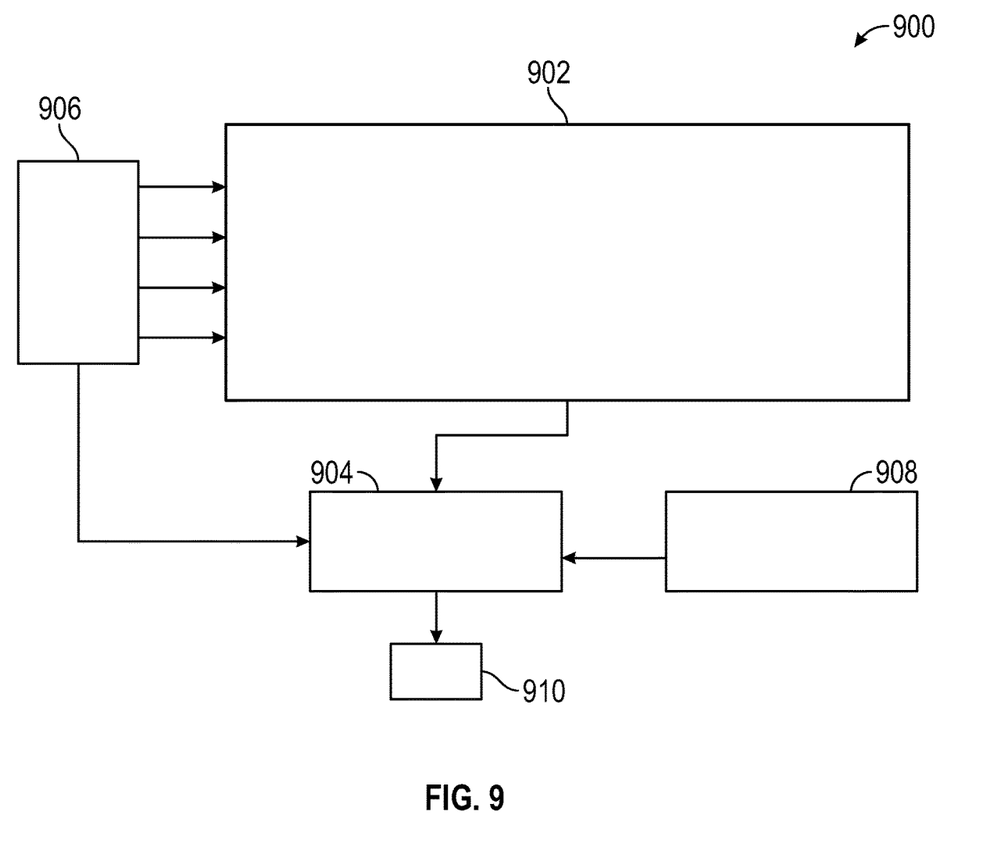
FIG. 9 shows a block diagram of a method for estimating the tab temperature using a Kalman filter in one embodiment.

FIG. 9 shows a block diagram 900 of a method for estimating the tab temperature $T_{tab}$ using a Kalman filter in one embodiment. The predicted temperature provided by the dynamic thermal equations disclosed herein can be improved upon using a Kalman filter. The block diagram 900 shows a dynamic model estimator 902 and a Kalman filter 904. The dynamic model estimator 902 receives input variables 906 including current (I), maximum temperature ($T_{max}$) and minimum temperature ($T_{min}$) and calculates a thermal state of the battery cell using the Eqs. (1)-(3). An observation parameter y is determined based on a linear combination of the state variables $T_{tab}$, $T_{min}$ and $T_{max}$, as shown in Eq. (9):

$$y = a_1 T_{tab} + a_2 T_{min} + a_3 T_{max} \quad \text{Eq. (9)}.$$

The input variables I, $T_{max}$ and $T_{min}$ are also sent to the Kalman filter 904. The Kalman filter 904 receives, the state variables, the observation parameter y and a filtered temperature value 908 based on a temperature of the battery disconnect unit 212 ($T_{BDU}$), as shown in Eq. (10):

$$y = T_{bdu}/(\tau(T_{max})s+1) \quad \text{Eq. (10)}$$

where $\tau$ is a function of $T_{max}$ and $(\tau s+1)^{-1}$ is a filter applied to the temperature $T_{bdu}$ of the battery disconnect unit 212. The Kalman filter 904 outputs a predicted value 910 of the tab temperature $T_{tab}$.

Figure 10:
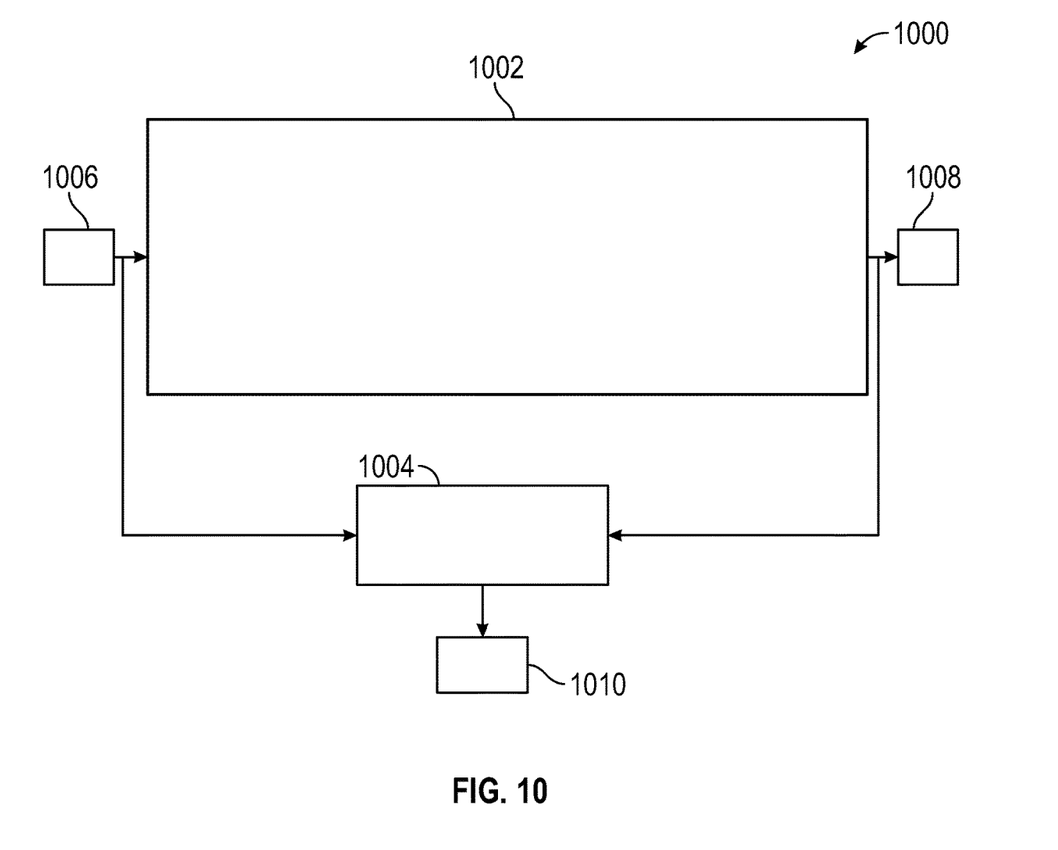
FIG. 10 shows a block diagram of a method of estimating the tab temperature using a Kalman filter in another embodiment.

FIG. 10 shows a block diagram 1000 of a method of estimating the tab temperature using a Kalman filter in another embodiment. The block diagram 1000 shows a dynamic model estimator 1002 and a Kalman filter 1004. The dynamic model estimator 1002 receives input variables 1006 of current (I) and minimum temperature ($T_{min}$) and calculates a thermal state of the battery cell using Eqs. (11)-13):

$$C_{tab}dT_{tab}/dt = I^2 R_{tab} - K_1(T_{tab}-T_{max}) - K_2(T_{sink}-T_{tab}) \quad \text{Eq. (11)}$$

$$C_{bus}dT_{bus}/dt = I^2 R_{bus} + K_2(T_{sink}-T_{tab}) - K_3(T_{sink}-T_{min}) \quad \text{Eq. (12)}$$

$$C_{max}dT_{max}/dt = I^2 R_{max} + K_1(T_{tab}-T_{max}) - K_4(T_{max}-T_{min}) \quad \text{Eq. (13)}$$

An observation parameter y consists of two values: $T_{tab}$ and $T_{max}$, as shown in Eq. (14):

$$y = [y_1, y_2] = [T_{tab}, T_{max}] \quad \text{Eq. (14)}.$$

The input variables 1006 (I and $T_{min}$) as well as a measured value parameter 1008 for the maximum temperature $T_{max}$ of the battery module are also sent to the Kalman filter 1004. The Kalman filter 1004 outputs a predicted value 1010 for the tab temperature $T_{tab}$.

Figure 11:
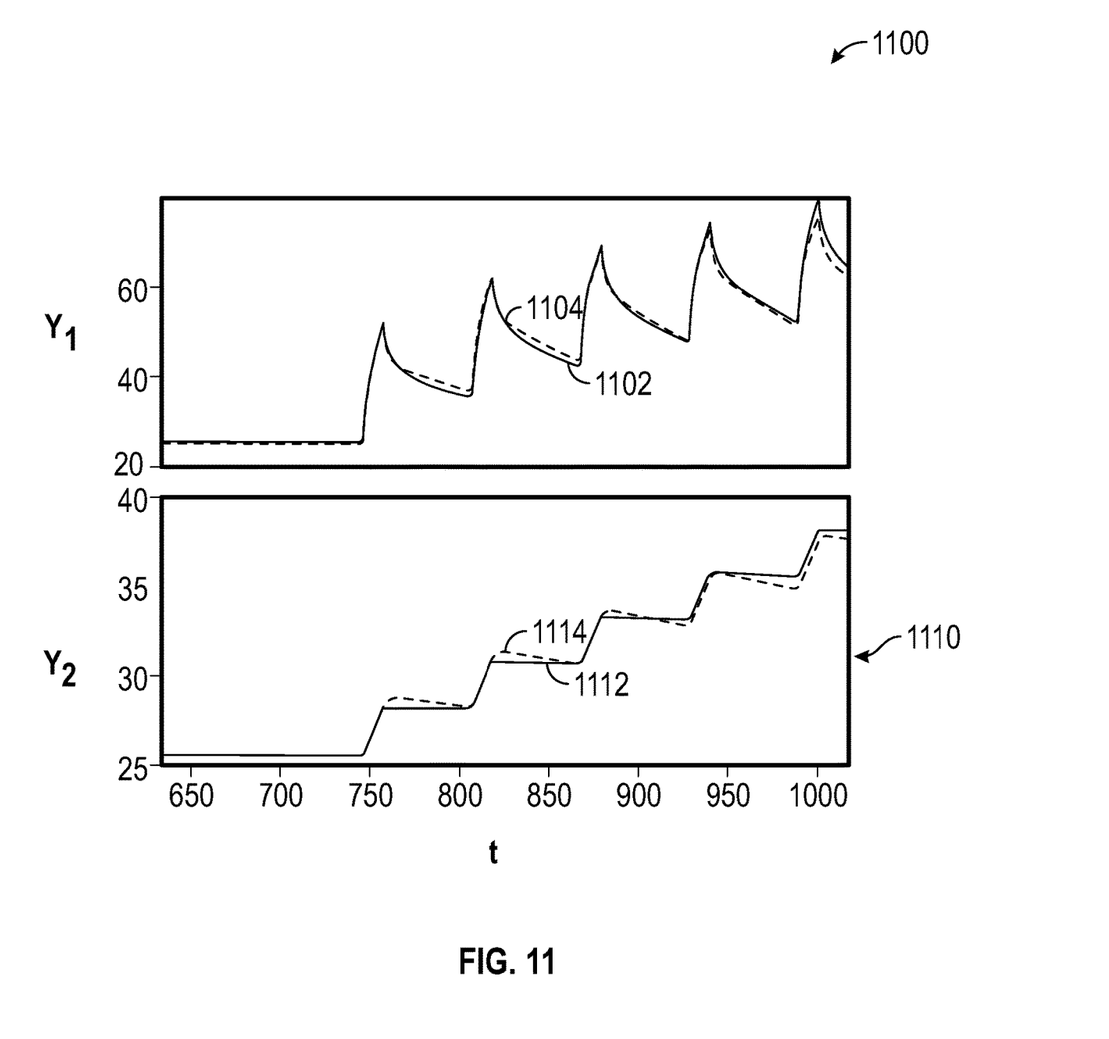
FIG. 11 shows a simulation response comparison of the output of the Kalman filter of FIG. 10 to actual temperature measurements.

FIG. 11 shows a simulation response comparison of the output (y1, y2) of the Kalman filter of FIG. 10 to actual temperature measurements. Graph 1100 shows a comparison of the predicted value of $T_{tab}$ (curve 1104) to measured values of $T_{tab}$ (curve 1102). Curve 1102 agrees with curve 1104 with 93.88% accuracy. Graph 1110 shows a comparison of the predicted value of $T_{max}$ (curve 1114) to measured values of $T_{max}$ (curve 1112). Curve 1112 agrees with curve 1114 with 94.68% accuracy.

Figure 12:
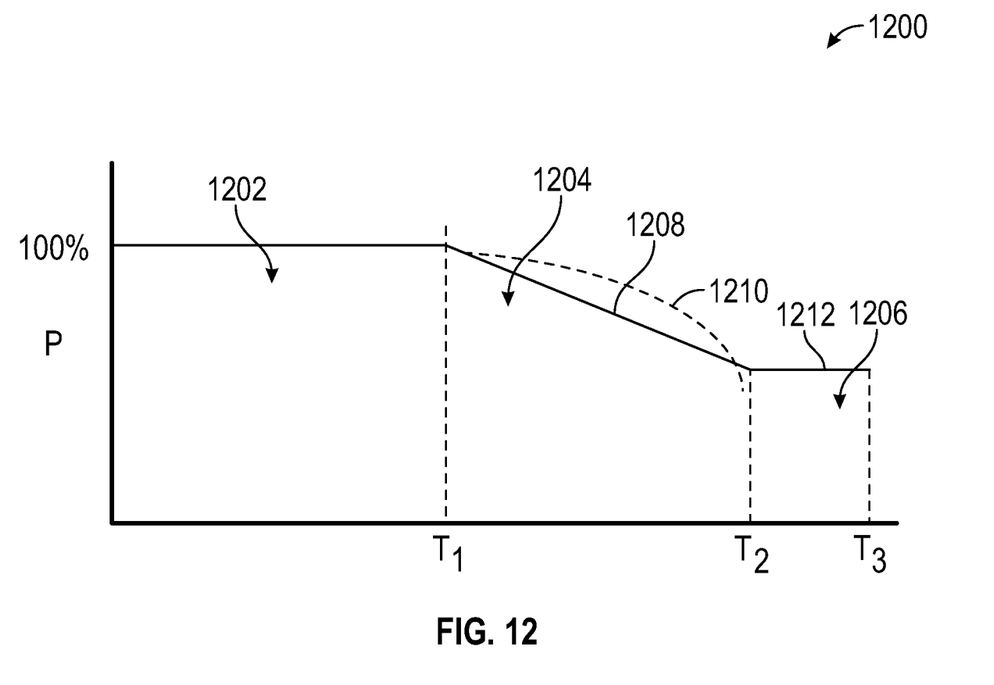
FIG. 12 shows a power allowance graph for the battery pack.

FIG. 12 shows a power allowance graph 1200 for the battery pack.

Temperature is shown along the x-axis and battery power is shown along the y-axis. The power of the battery pack can thus be controlled or selected using tab temperatures predicted or calculated using the methods disclosed herein, based on the power allowance graph 1200. Temperature limits separate the graph into operating regions. Temperature T1 marks a full power operating region 1202 for the tab. Temperature T1 and temperature T2 marks a power derating region 1204. Temperature T2 and temperature T3 mark a minimal power operating region 1206. In the full power operating region 1202, the battery pack can be operated at full power (100% power) without causing thermal harm or thermal impairment to the tab or battery cell. No power-regulating steps need to be taken. In the power derating region 1204, the power of the battery cell is derated or reduced to prevent power through the tab from exceeding a power limit of the battery cell. The power deration lowers the temperature of the cell tab back below its temperature limit T1. The derating process in the power derating region 1204 can be linear with temperature as shown by derating line 1208 or nonlinear with temperature as indicated by derating curve 1210. The derating process can occur until the tab temperature reaches T2. Line 1212 represents a minimum power allowed at the load (e.g., a minimum propulsion power of the electrical motor 202) for temperatures that are greater than temperature T2. Dropping the power below this line turns off the vehicle. Thus, the power can no longer be derated in the minimal power operating region 1206.

Figure 13:
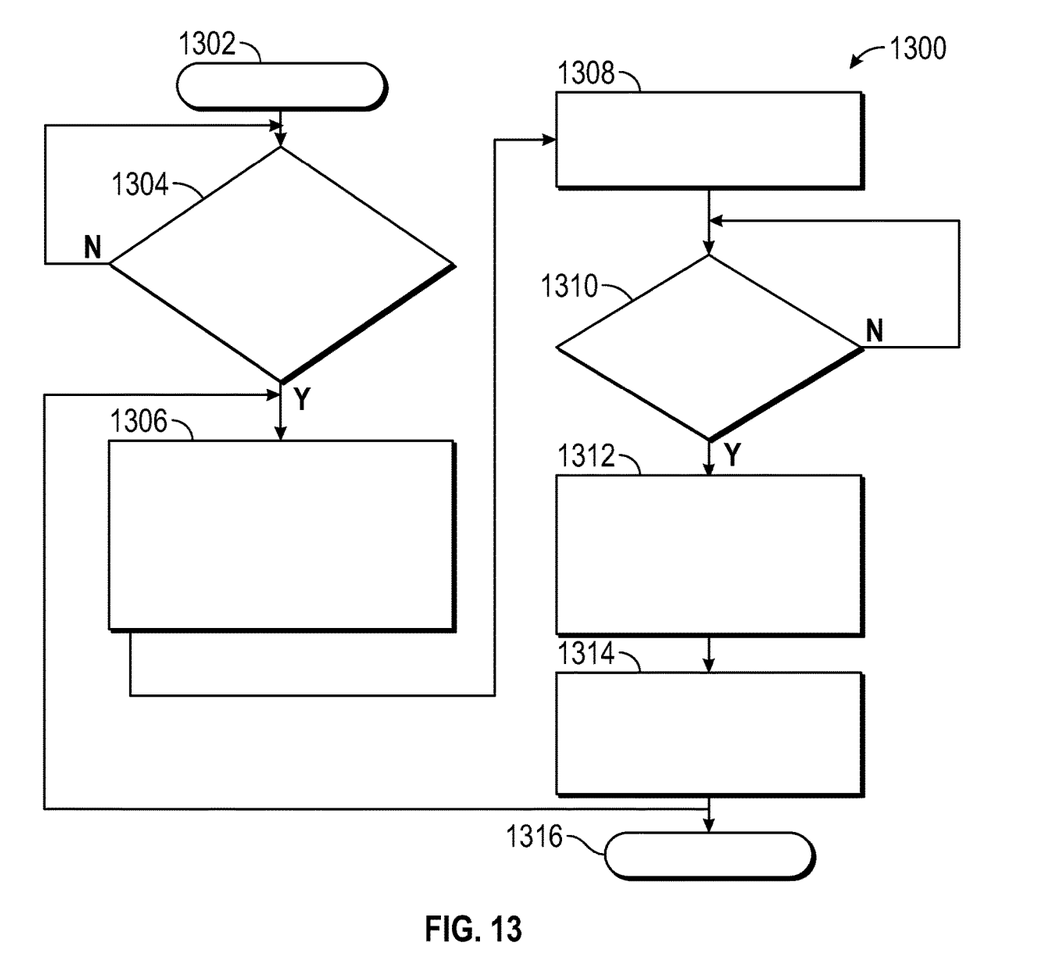
FIG. 13 shows a flowchart of a method for managing a power output of a battery pack based on a tab temperature.

FIG. 13 shows a flowchart 1300 of a method for managing a power output of a battery pack based on a tab temperature. The method starts at box 1302. In box 1304, a check is made to see if a contactor is closed for the high voltage main line or the direct current fast charging line. If the contactor is not closed, the method loops through box 1304 until it is closed. If the contactor is closed, the method proceeds to box 1306. At box 1306, the tab temperature $T_{tab}$ is predicted using the dynamic models disclosed herein, or alternative modeling methods, such as using neural network models or other nonlinear function models and look up tables.

At box 1308, a limiting tab temperature is defined. At box 1310, the predicted tab temperature is compared to the limiting tab temperature. If the predicted tab temperature is less than the limiting tab temperature, the method loops through box 1310. If the predicted tab temperature is greater than or equal to the limiting tab temperature, the method proceeds to box 1312. At box 1312, a maximum current limit for a battery cell is calculated based on the limiting tab temperature and the dynamic model. At box 1314, an allowed battery power is predicted based on the calculated maximum current limit allowed for the battery cell. The process can loop from box 1314 back to box 1306 to repeat. Otherwise, the process ends at box 1316.

Figure 14:
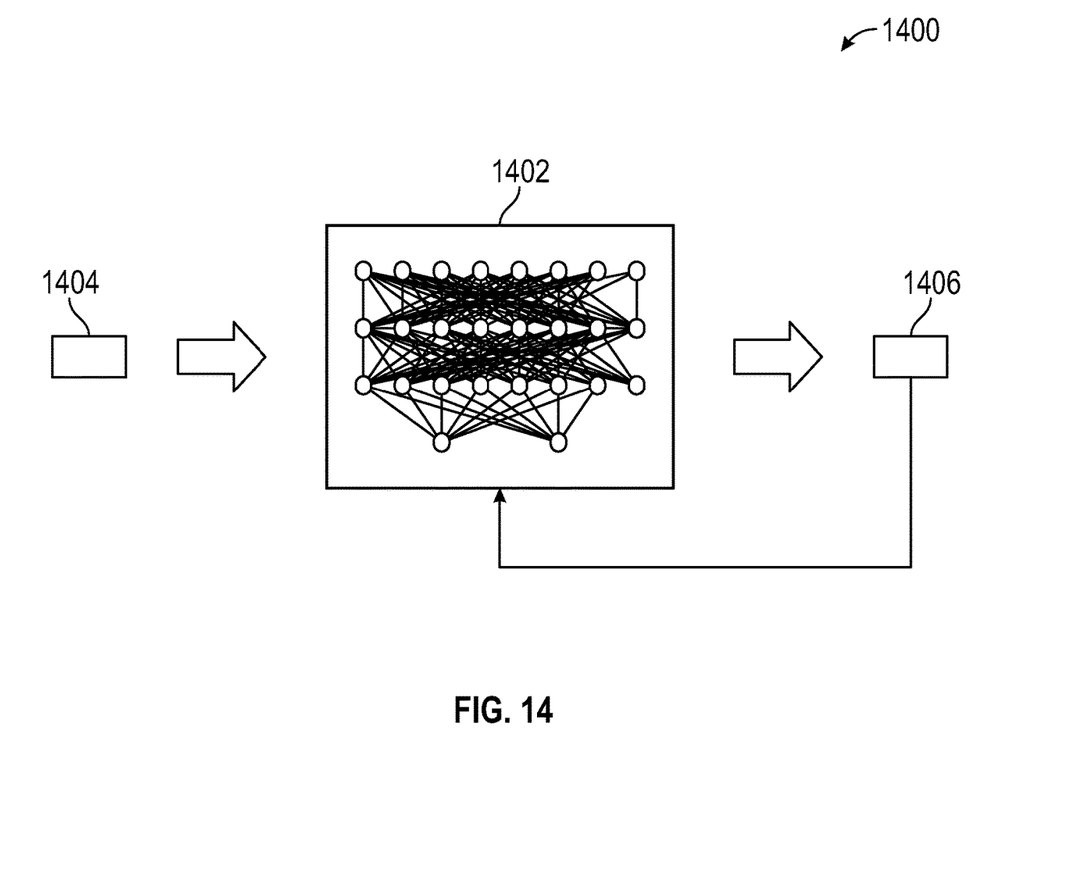
FIG. 14 shows a diagram of a method for using a neural network to predict a cell temperature.

FIG. 14 shows a diagram 1400 of a method for using a neural network to predict a cell temperature. In various embodiments, the neural network 1402 can be a recurrent neural network. A neural network contains layers of interconnected nodes. Each node performs an algorithm similar to a multiple linear regression. A recurrent neural network includes recurrent layers. A recurrent layer includes a looping capability such that its input consists of both the data to analyze as well as the output from a previous calculation performed by that layer. The connections between nodes form a directed graph along a temporal sequence. The neural network 1402 can receive as input 1404 a plurality of measurements u(t) such as battery current, minimum temperature, maximum temperature and BDU temperature. The neural network 1402 generates a tab temperature $T_{tab}$ as output 1406. The tab temperature $T_{tab}$ can be reintroduced as input to the neural network 1402 at a subsequent time step of the neural network to improve the accuracy of the neural network.

The battery pack used in electric vehicles includes battery modules and battery cells which have tabs for flow of electricity. A tab generates heat due to the flow of electricity through it, leading to the possibility of thermal damage to the battery cell when the tab temperature is too high. Due to the size and location of the tab, it is often impractical to provide a temperature sensor directly at the tab for monitoring purposes. The present invention therefore calculates a tab temperature of a battery cell or battery module of a battery pack without directly measuring the tab temperature by using temperatures obtained at non-tab locations of the battery module. The calculated tab temperature can be used to controlling power usage of the battery pack. Controlling the power usage operates the battery cell within safe temperature regions so that the battery cell and battery pack does not overheat, thereby extending the life to the battery pack.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of controlling a temperature at a battery cell, comprising:
measuring a cell temperature at the battery cell, the battery cell including a tab for flow of current to and from the battery cell, wherein the cell temperature is obtained at a location away from the tab;
predicting, using a processor, a tab temperature for the tab from the cell temperature; and
controlling, using the processor, a power supplied to a load from the battery cell based on the tab temperature.

2. The method of claim 1, wherein the battery cell is included in a battery module and obtaining the cell temperature further comprises obtaining one of: (i) a maximum temperature and a minimum temperature for the battery cell at a location of the battery module separate from the battery cell; and (ii) an average temperature of the battery cell.

3. The method of claim 1, further comprising predicting the tab temperature using a dynamic thermal model of a heat exchange process around the cell tab and current bus bar that is based on a current at the battery cell and the cell temperatures.

4. The method of claim 3, wherein the tab is in thermal contact with a bus and the bus is in thermal contact with a heat sink, the dynamic thermal model determining a state of the battery cell based on a thermal heating of the tab, the bus and the heat sink due to the current through the tab.

5. The method of claim 4, further comprising applying a Kalman filter to the state of the battery cell determined using the dynamic thermal model to determine the tab temperature.

6. The method of claim 1, further comprising derating the power supplied to the load when the tab temperature is greater than or equal to a temperature limit.

7. The method of claim 1, wherein the load is at least one of (i) an electric motor of a vehicle; and (ii) an electrical component of the vehicle.

8. A system for controlling a temperature at a battery cell, comprising:
- a temperature sensor configured to measure a cell temperature at the battery cell, the battery cell including a tab for flow of current to and from the battery cell, wherein the temperature sensor is at a location away from the tab; and
- a processor configured to:
  - predict a tab temperature for the tab from the cell temperature; and
  - control a power supplied to a load from the battery cell based on the tab temperature.

9. The system of claim 8, wherein the battery cell is included in a battery module and the temperature sensor further comprises one of: (i) a maximum temperature sensor for measuring a maximum temperature of the battery module and a minimum temperature sensor for measuring a minimum temperature of the battery module; and (ii) an average temperature sensor for measuring an average temperature of the battery cell.

10. The system of claim 8, wherein the processor is further configured to predict the tab temperature using a dynamic thermal model of the battery cell based on a current at the battery cell and the cell temperature.

11. The system of claim 10, wherein the tab is in thermal contact with a bus and the bus is in thermal contact with a heat sink, and the processor is further configured to determine a state of the battery cell using the dynamic thermal model, the dynamic thermal model based on a thermal heating of the tab, the bus and the heat sink due to the current through the tab.

12. The system of claim 11, wherein the processor is further configured to apply a Kalman filter to the state of the battery cell determined using the dynamic thermal model to determine the tab temperature.

13. The system of claim 8, wherein the processor is further configured to derate the power supplied to the load when the tab temperature is greater than or equal to a temperature limit.

14. The system of claim 13, wherein the processor is further configured to derate the power based on a maximum allowed battery current limit, the battery current limit being based on the temperature limit and dynamic thermal model of the battery cell.

15. A vehicle, comprising:
- a battery cell having a tab for flow of current to and from the battery cell;
- a temperature sensor configured to measure a cell temperature of the battery cell at a location away from the tab; and
- a processor configured to:
  - predict a tab temperature from the cell temperature; and
  - control a power supplied to a load from the battery cell based on the tab temperature.

16. The vehicle of claim 15, wherein the battery cell is included in a battery module and the temperature sensor further comprises one of: (i) a maximum temperature sensor for measuring a maximum temperature of the battery module or a battery pack that includes the battery module and a minimum temperature sensor for measuring a minimum temperature of the battery module or pack; and (ii) an average temperature sensor for measuring an average temperature of the battery module or pack.

17. The vehicle of claim 15, wherein the processor is further configured to predict the tab temperature using a dynamic thermal model of the battery cell based on a current at the battery cell and the cell temperature.

18. The vehicle of claim 17, wherein the tab is in thermal contact with a bus and the bus is in thermal contact with a heat sink, and the processor is further configured to determine a state of the battery cell using a dynamic thermal model, the dynamic thermal model including on a thermal heating of the tab, the bus and the heat sink due to the current through the tab.

19. The vehicle of claim 18, wherein the processor is further configured to apply a Kalman filter to the state of the battery cell determined using the dynamic thermal model to determine the tab temperature.

20. The vehicle of claim 15, wherein the processor is further configured to derate the power supplied to the load when the tab temperature is greater than or equal to a temperature limit.

* * * * *